(12) United States Patent
Chao

(10) Patent No.: US 7,730,245 B2
(45) Date of Patent: Jun. 1, 2010

(54) METHOD AND SYSTEM FOR SETTING ADDRESSES FOR SLAVE DEVICES IN DATA COMMUNICATION SYSTEM

(75) Inventor: Kuo-Sheng Chao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 92 days.

(21) Appl. No.: 12/051,861

(22) Filed: Mar. 20, 2008

(65) Prior Publication Data
US 2009/0177823 A1 Jul. 9, 2009

(30) Foreign Application Priority Data
Jan. 4, 2008 (CN) ......................... 2008 1 0300020

(51) Int. Cl.
*G06F 13/18* (2006.01)
(52) U.S. Cl. .................................... 710/110
(58) Field of Classification Search .......... 710/104–117
See application file for complete search history.

(56) References Cited

U.S. PATENT DOCUMENTS 6,799,234 B1 * 9/2004 Moon et al. ............... 710/110

2003/0051016 A1 * 3/2003 Miyoshi et al. ............. 709/222

OTHER PUBLICATIONS

Springer Berlin Heidelberg, Simple RS485 Network with Microcontrollers, Mar. 30, 2006, pp. 163-172.*

* cited by examiner

*Primary Examiner*—Raymond N Phan
(74) *Attorney, Agent, or Firm*—Frank R. Niranjan

(57) ABSTRACT

A system for setting addresses includes a master device, a plurality of slave devices, and a bus. The master device includes a broadcasting module, a reading module, a responding module, an address assigning module, and a first judging module. Each slave device includes a performing module and a requesting module. The broadcasting module is configured to send messages to the slave devices. The performing module is configured to put the slave device be in an address setting mode. The reading module is configured to read a time assignment for each slave device from a timing module. The requesting module is configured to send an address request. The responding module is configured to respond to the address request. The address assigning module is configured to assign an address to the slave device. The first judging module is configured to check if all the time windows for the slave devices have elapsed.

6 Claims, 5 Drawing Sheets

METHOD AND SYSTEM FOR SETTING ADDRESSES FOR SLAVE DEVICES IN DATA COMMUNICATION SYSTEM

BACKGROUND

1. Field of the Invention

The present invention relates to a method and system for setting addresses in a data communication system.

2. Description of Related Art

In communication circuits, serial interfaces such as RS485 serial interfaces are familiar communication interfaces for data communications between a master device such as a server and a plurality of slave devices such as uninterrupted power supplies (UPS). In communication between the master device and the slave devices, the master device transmits data to a slave device by using an address of the slave device. A slave device receives data corresponding to its own number and transmits response data to the master device. Thus the master device is able to transmit data to a slave device.

A way to set addresses in earlier RS485 control systems uses two rotary address switches to set the address. The two rotary address switches use a decimal format to set the addresses of the slave devices of the RS485 bus control system. When the RS485 bus control system includes several hundred or several thousand slave devices, setting the addresses of the slave devices becomes time consuming, and the possibility of mistakes is great.

What is desired, therefore, is to provide a method and system for setting respective identification numbers for a plurality of slave devices constituting a network.

SUMMARY

An embodiment of a system for setting addresses comprises a master device, a plurality of slave devices, and a bus. The master device comprises a broadcasting module, a reading module, a responding module, an address assigning module, and a first judging module. Each of the slave devices comprises a performing module and a requesting module. The bus comprises a timing module for assigning a window in time during which a slave device communicates with the master device. The master device is connected to the slave devices via the bus. The broadcasting module of the master device is configured to send a message to the slave devices. The performing module of the slave device is configured to put the slave device be in an address setting mode when the slave devices receive the message from the broadcasting module. The reading module of the master device is configured to read a time assignment for each slave device from the timing module of the bus. The requesting module of the slave device is configured to send an address request during the slave device assigned time window. The responding module of the master module is configured to respond to the address request from the slave devices. The address assigning module is configured to assign an address to each of the slave devices. The first judging module is configured to check if all the time windows for the slave devices have elapsed.

Other advantages and novel features of the present invention will become more apparent from the following detailed description of preferred embodiment when taken in conjunction with the accompanying drawings, in which:

DETAILED DESCRIPTION

Figure 1:
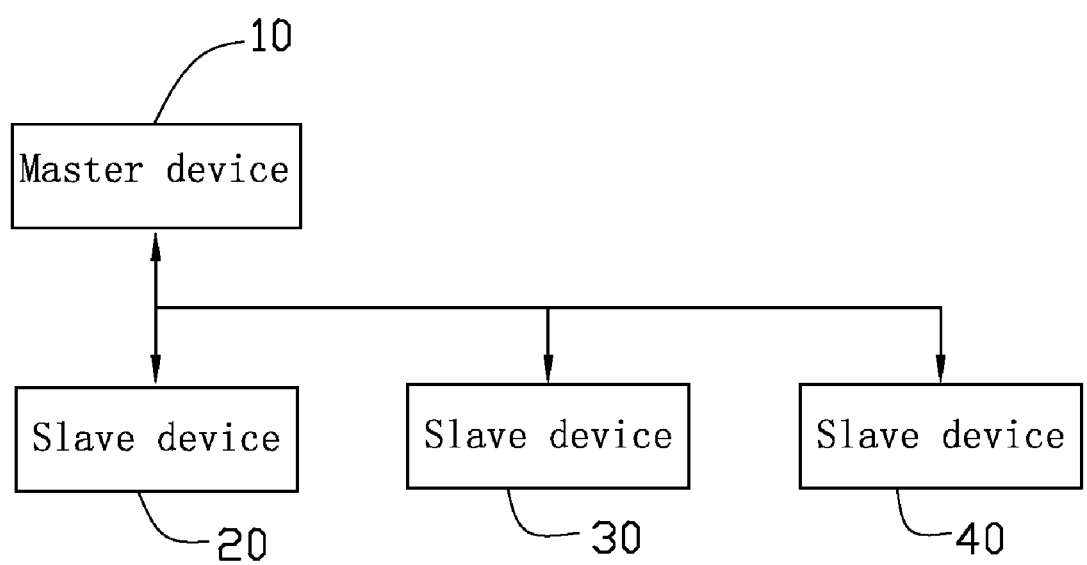
FIG. 1 is a block diagram of a system for setting addresses in accordance with an exemplary embodiment, the system including a master device, three slave devices, and a bus.

Referring to the FIG. 1, a system for setting addresses in accordance with an exemplary embodiment of the present invention includes a master device 10 such as a computer system, and a plurality of slave devices such as three slave devices 20, 30, and 40. The master device 10 is connected to the slave devices 20, 30, and 40 via a bus, such as an RS485 bus.

Figure 2:
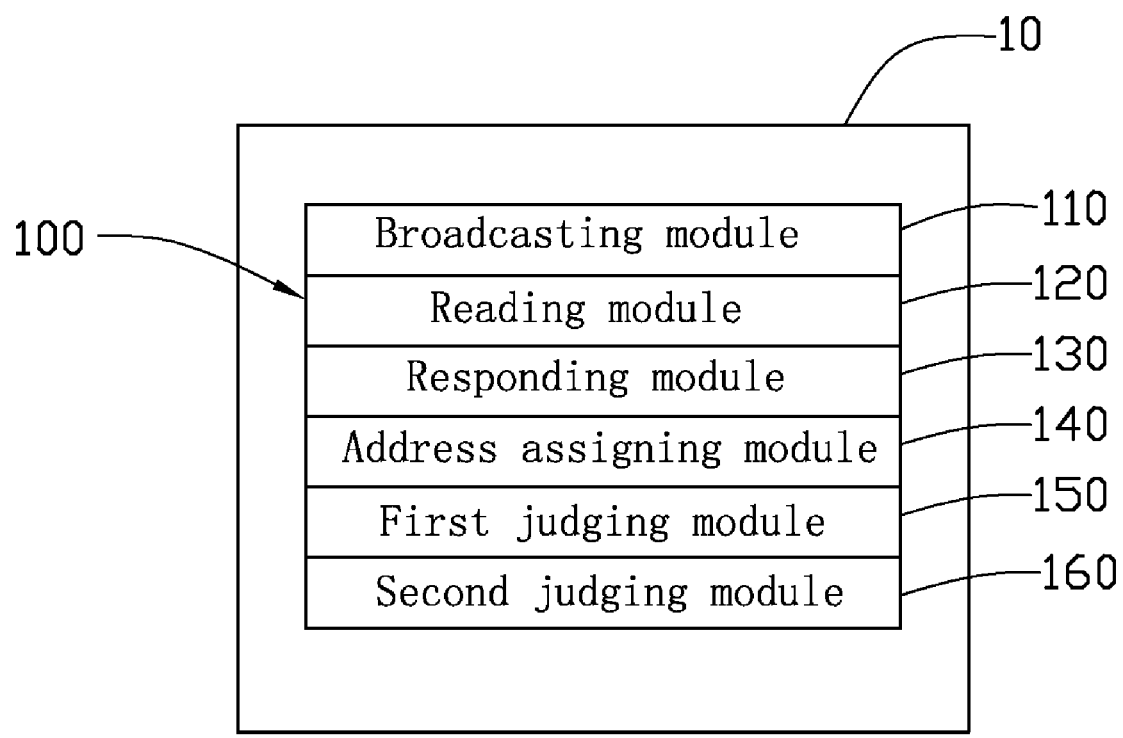
FIG. 2 is a schematic diagram of the master device in FIG. 1.
Figure 3:
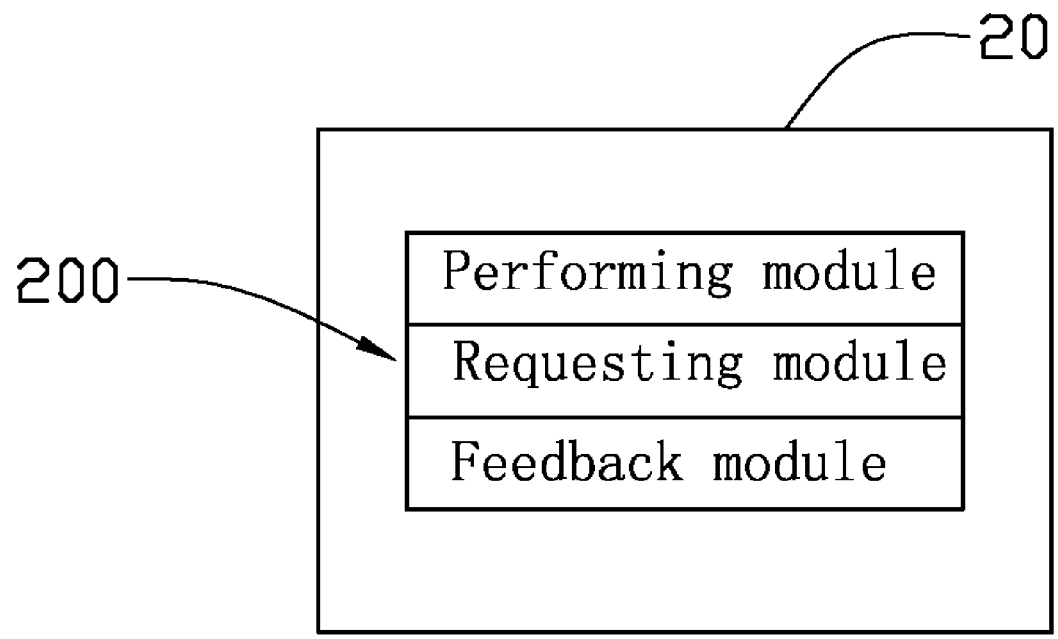
FIG. 3 is a schematic diagram of a slave device in FIG. 1.
Figure 4:
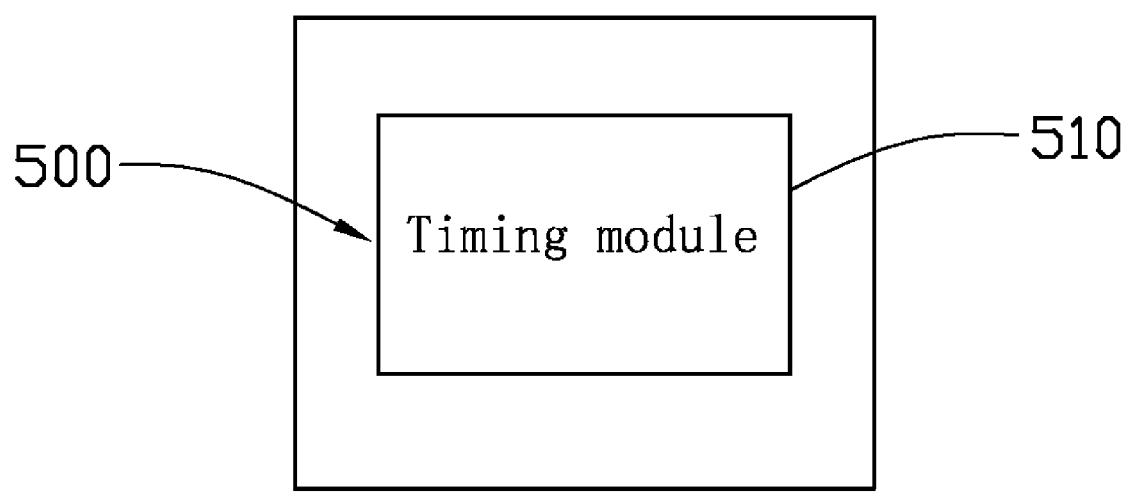
FIG. 4 is a schematic diagram of the bus device in FIG. 1.

Referring to the FIGS. 2-4, the master device 10 includes a memory 100, a CPU, and a motherboard, etc. The memory 100 includes a broadcasting module 110, a reading module 120, a responding module 130, an address assigning module 140, a first judging module 150, and a second judging module 160. The slave device 20 includes a memory 200, a CPU, and a motherboard, etc. The memory 200 includes a performing module, a requesting module, and a feedback module. The slave devices 30 and 40 are similar to the slave device 20. The RS485 bus includes a memory 500. The memory 500 includes a timing module 510 for assigning a time window during which a slave device communicates with the maser device 10.

The broadcasting module 110 of the master device 10 is configured to send messages to the slave devices 20, 30, and 40. The performing modules of the slave devices 20, 30, and 40 put the slave devices in an address setting mode when they receive the messages from the broadcasting module 100 of the master device 10. The reading module 120 is configured to read a time assignment for each slave device from the timing module 510 of the bus. The requesting module is configured to send an address request during the slave device assigned time window. The responding module 130 is configured to respond to the address request from the slave devices. The address assigning module 140 is configured to assign an address to each slave device. The first judging module 150 is configured to check if all the time windows for the slave devices have elapsed. The feedback module is configured to send an "address setting ok" signal to the master device 10 when the slave device receives an address from the address assigning module 140. The second judging module 160 is configured to check if the slave device has an address according to the "address setting ok" signal. If the master device 10 receives an "address setting ok" signal, the slave device has an address. The timing module 510 is configured to assign a time window to each of the slave devices. Only one corresponding slave device sends an address request to the master device 10 in one corresponding time window.

Figure 5:
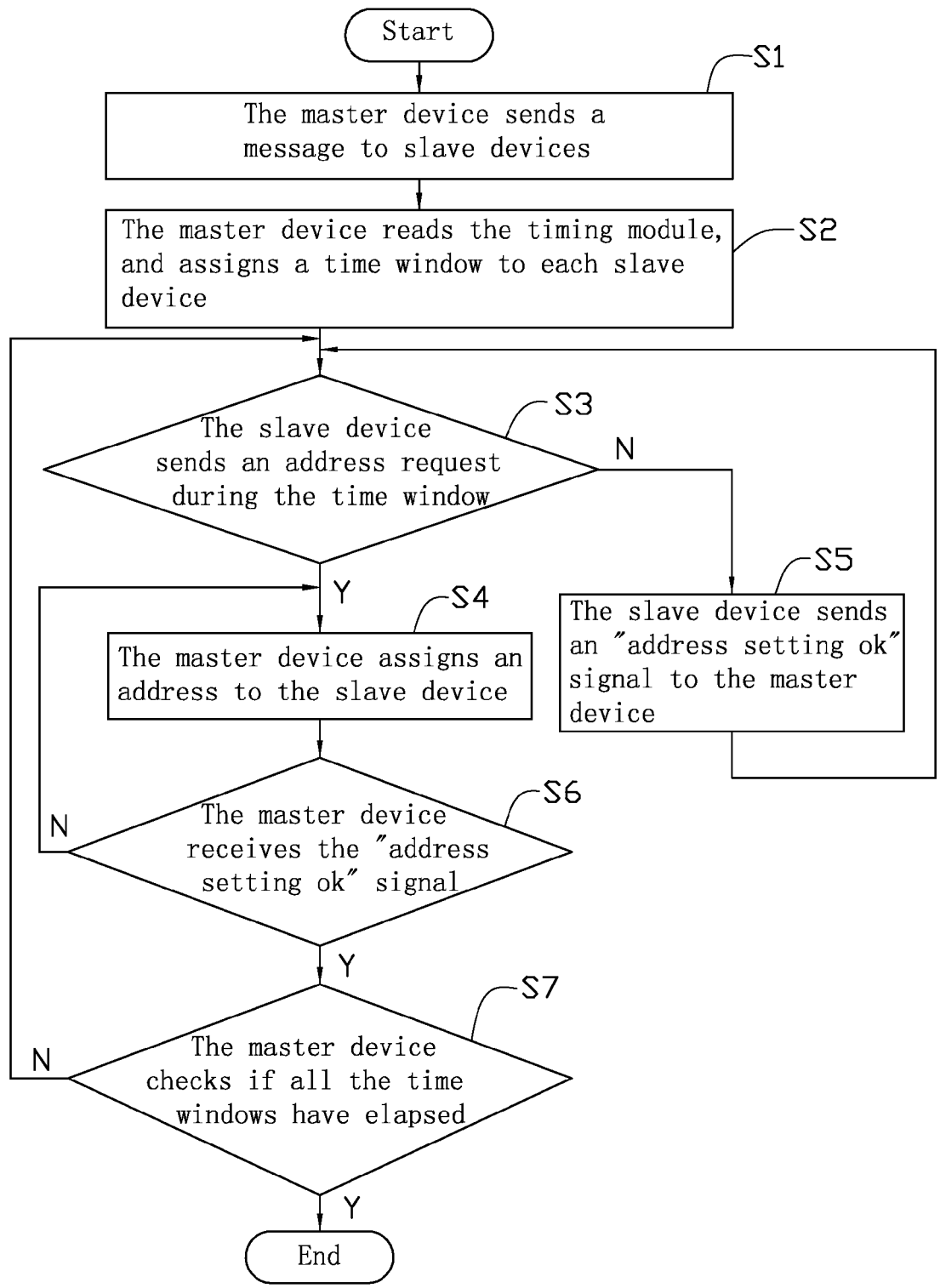
FIG. 5 is a flow chart of a method for setting addresses in accordance with an exemplary embodiment applied to the system of FIG. 1.

Referring to FIG. 5, a method of setting address with the system in accordance with an embodiment of the present invention includes:

Step S1: the master device 10 sending a message, which puts the slave devices be in an address setting mode, to the slave devices 20, 30, and 40;

Step S2: the master device 10 reading the timing module 510, and assigning a time window to each slave device;

Step S3: the slave device sending an address request during the slave device assigned time window;

Step S4: the master device 10 assigning an address to the slave device, if the master device 10 receives no address request from the slave devices 20, 30, and 40, returning the step S3;

Step S5: the slave device sending an "address setting ok" signal to the master device 10 when the slave device receives the addresses from the address assigning module 140;

Step S6: the master device 10 checking if the address setting is accomplished according to the "address setting ok" signal, if the master device 10 receives the "address setting ok" signal from a slave device, the address setting for the slave device is accomplished, if the master device 10 receives no "address setting ok" signal from a slave device, returning to the step S4; and Step S7: the master device 10 checking if all the time windows for the slave devices 20, 30, and 40 have elapsed, if all the time windows have elapsed, the address setting for the slave devices ends, if all the time windows have elapsed, returning to the step S3.

In this embodiment, advantage is taken of the only serial number of a slave device when the slave device is made. The timing module 510 assigns a time window to each slave device according to its serial number. Thus, the system and method for setting addresses in a data communication system becomes simple and time-saving. The second judging module 160, the feedback modules of the slave devices 20, 30, and 40, and the steps S6 and S7 can be omitted according to need.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for setting addresses in a data communication system comprising:
    a master device comprising a broadcasting module, a reading module, a responding module, an address assigning module, and a first judging module;
    a plurality of slave devices, each of the slave devices comprising a performing module and a requesting module, each slave device has a unique serial number; and
    a bus comprising a timing module, the master device connected to the slave devices via the bus, the broadcasting module of the master device configured to send a message to the slave devices, the performing module of each slave device configured to put each slave device be in an address setting mode when each slave device receives the message from the broadcasting module, the reading module of the master device configured to read a time assignment for each slave device from the timing module of the bus, the requesting module of each slave device configured to send an address request during the time window correspondingly, the responding module of the master module configured to respond to the address request from each slave device, the address assigning module configured to assign an address to each slave device, the first judging module configured to check if all the time windows for the slave devices have elapsed, wherein the timing module assigns the time assignment for each slave device according to the serial number of each slave device.

2. The system for setting addresses in a data communication system as claimed in claim 1, wherein each of the slave devices further comprises a feedback module, the master device further comprises a second judging module, the feedback module is configured to send an "address setting ok" signal to the master device when the slave devices receive the addresses from the address assigning module of the master device, the second judging module is configured to check if each slave device has an address according to the "address setting ok" signal.

3. The system for setting addresses in a data communication system as claimed in claim 1, wherein the master device is a computer system.

4. The system for setting addresses in a data communication system as claimed in claim 1, wherein the master device is connected to the slave devices via an RS485 bus.

5. A method for setting addresses in the system as claimed in claim 1 comprising:
    the master device sending messages, which put the slave devices be in an address setting mode, to the slave devices;
    the master device reading the timing module, and assigning a time window to each of the slave devices, wherein the timing module assigns the time window to each slave device according to the serial number of each slave device;
    each slave device sending an address request during the time window correspondingly;
    the master device assigning an address to each slave device; and
    the master device checking if all the time windows for the slave devices have elapsed, if all the time windows have elapsed, the address setting for the slave devices ends, if all the time windows have not elapsed, the master device is waiting for next time window.

6. A method for setting addresses in the system as claimed in claim 2 comprising:
    the master device sending messages, which put the slave devices in an address setting mode, to the slave devices;
    the master device reading the timing module, and assigning a time window to each of the slave devices;
    each slave device sending an address request during the time window correspondingly;
    the master device assigning an address to each slave device;
    each slave device sending an "address setting ok" signal to the master device when each slave device receives the address from the address assigning module;
    the master device checking if the address setting is accomplished according to the "address setting ok" signal, if the master device receives the "address setting ok" signal from the slave device, the address setting for the slave device is accomplished, if the master device receives no "address setting ok" signal from the slave device, the master device assigns the address to the slave device again; and
    the master device checking if all the time windows for the slave devices have elapsed, if all the time windows have elapsed, the address setting for the slave devices ends, if all the time windows have not elapsed, the master device is waiting for next time window.

* * * * *